United States Patent
Xuan et al.

(10) Patent No.: US 11,658,767 B2
(45) Date of Patent: *May 23, 2023

(54) METHOD AND DEVICE FOR ADJUSTING NEURAL-NETWORK-BASED WIRELESS MODEM

(71) Applicant: BEIJING XIAOMI MOBILE SOFTWARE CO., LTD., Beijing (CN)

(72) Inventors: Lin Xuan, Beijing (CN); Yang Guo, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/453,180

(22) Filed: Nov. 1, 2021

(65) Prior Publication Data
US 2022/0052780 A1 Feb. 17, 2022

Related U.S. Application Data

(63) Continuation of application No. 16/693,095, filed on Nov. 22, 2019, now Pat. No. 11,190,296.

(30) Foreign Application Priority Data

Aug. 16, 2019 (CN) .......................... 201910760086.0

(51) Int. Cl.
*H04L 1/00* (2006.01)
*H04B 17/318* (2015.01)
(Continued)

(52) U.S. Cl.
CPC ............. *H04L 1/0009* (2013.01); *G06N 3/08* (2013.01); *H04B 17/318* (2015.01);
(Continued)

(58) Field of Classification Search
CPC ... H04L 1/0009; H04L 1/0003; H04L 1/0026; H04L 1/203; H04L 5/0007; H04L 5/0053; H04B 17/318; G06N 3/08
See application file for complete search history.

(56) References Cited

U.S. PATENT DOCUMENTS 11,190,296 B2 * 11/2021 Xuan ................. H04W 52/028
2004/0103330 A1 5/2004 Bonnett
(Continued)

FOREIGN PATENT DOCUMENTS

CN 101017980 A 8/2007
CN 108777157 A 11/2018
(Continued)

OTHER PUBLICATIONS

European Search Report in the European application No. 19214641.3, dated Jun. 17, 2020.
(Continued)

*Primary Examiner* — Khai M Nguyen
(74) *Attorney, Agent, or Firm* — Syncoda LLC; Feng Ma

(57) ABSTRACT

A method for adjusting a wireless modem includes: a channel parameter of a wireless modem at a present moment is acquired; a target clock frequency and a target working voltage of the wireless modem are generated, according to the channel parameter, with a neural network that is pre-trained; and a working voltage and a clock frequency of the wireless modem are adjusted to the target working voltage and the target clock frequency, respectively.

20 Claims, 7 Drawing Sheets

(51) Int. Cl.
   *G06N 3/08*  (2023.01)
   *H04L 1/20*  (2006.01)
   *H04L 5/00*  (2006.01)

(52) U.S. Cl.
   CPC .......... *H04L 1/0003* (2013.01); *H04L 1/0026* (2013.01); *H04L 1/203* (2013.01); *H04L 5/0007* (2013.01); *H04L 5/0053* (2013.01)

(56) References Cited

U.S. PATENT DOCUMENTS

| | | | |
|---|---|---|---|
| 2013/0142049 A1 | 6/2013 | Jim | |
| 2014/0301259 A1* | 10/2014 | Homchaudhuri | H04W 52/029 370/311 |
| 2015/0220097 A1* | 8/2015 | Kwong | G06F 1/206 700/291 |
| 2018/0183543 A1* | 6/2018 | Kim | H04L 1/0002 |
| 2021/0050932 A1* | 2/2021 | Xuan | G06F 1/324 |

FOREIGN PATENT DOCUMENTS

| | | | | |
|---|---|---|---|---|
| CN | 109636009 A | | 4/2019 | |
| EP | 3660628 A1 * | | 6/2020 | ........... G06F 1/3206 |
| KR | 20190089777 A | | 7/2019 | |
| WO | 2019117623 A1 | | 6/2019 | |
| WO | WO-2019117623 A1 * | | 6/2019 | ............. G06F 1/324 |

OTHER PUBLICATIONS

First Office Action of the Chinese application No. 201910760086.0, dated Jul. 15, 2021.
First Office Action of the U.S. Appl. No. 16/693,095, dated Mar. 11, 2021.
Notice of Allowance of the U.S. Appl. No. 16/693,095, dated Aug. 4, 2021.

\* cited by examiner

METHOD AND DEVICE FOR ADJUSTING NEURAL-NETWORK-BASED WIRELESS MODEM

CROSS-REFERENCE TO RELATED APPLICATIONS

This is a continuation of U.S. patent application Ser. No. 16/693,095 filed on Nov. 22, 2019, which claims priority to Chinese patent application No. 201910760086.0 filed on Aug. 16, 2019. The disclosures of these applications are hereby incorporated by reference in their entirety.

BACKGROUND

With the development of mobile communication technologies, a mobile terminal has become an indispensable tool in users' daily lives. A mobile terminal is usually provided with a wireless modem for data transmission on a bandwidth-limited wireless channel. Due to portability of the mobile terminal, the wireless modem is required to be as low as possible in power consumption. A Dynamic Voltage and Frequency Scaling (DVFS) mechanism is adopted to adjust working voltages and clock frequencies of a processor and a memory, based on a state combination table or an empirical formula according to statistical data and known channel state in a working process of the wireless modem, to reduce the power consumption.

SUMMARY

The present disclosure generally relates to the field of mobile terminals, and more specifically to a method and device for adjusting a wireless modem for a mobile terminal.

According to a first aspect of embodiments of the present disclosure, there is provided a method for adjusting a wireless modem, which can include:

a channel parameter of the wireless modem at a present moment is acquired;

a target clock frequency and a target working voltage of the wireless modem are generated, according to the channel parameter, with a neural network which is pre-trained; and a working voltage and a clock frequency of the wireless modem are adjusted to the target working voltage and the target clock frequency respectively.

According to a second aspect of the embodiments of the present disclosure, there is provided a device for adjusting a wireless modem, which can include:

a processor; and a memory configured to store an instruction executable for the processor, the processor is configured to:

acquire a channel parameter of the wireless modem at a present moment;

generate, according to the channel parameter, a target clock frequency and a target working voltage of the wireless modem with a neural network which is pre-trained; and adjust a working voltage and a clock frequency of the wireless modem to the target working voltage and the target clock frequency respectively.

According to a third aspect of the embodiments of the present disclosure, there is provided a non-transitory computer-readable storage medium having stored a computer program that, when being executed by a processor, implements the operations of the method for adjusting the wireless modem provided in the first aspect.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Before a method and a device for adjusting a wireless modem provided in the present disclosure are introduced, an application scenario involved in various embodiments of the present disclosure can be introduced at first. The application scenario is a wireless modem in any wireless communication terminal, configured for data transmission on a wireless channel. The wireless modem can include portions such as a processor, a memory, a digital baseband processing portion, a filter, an equalizer, a modulation portion, a demodulation portion, a coder and a decoder.

The wireless channel changes in real time, and the statistical data and the known channel state may have hysteresis. As such, it may be impossible to control a working voltage and a clock frequency of the wireless modem to be adjusted to an optimal state. Moreover, the empirical formula is relatively low in reliability, and the adjusting accuracy of working voltage and clock frequency may further be reduced.

Various embodiments of the present disclosure can provide a method and a device for adjusting a wireless modem, to solve at least the problem of hysteresis and inaccuracy of an adjustment of a working voltage and a clock frequency in some typical systems.

Figure 1:
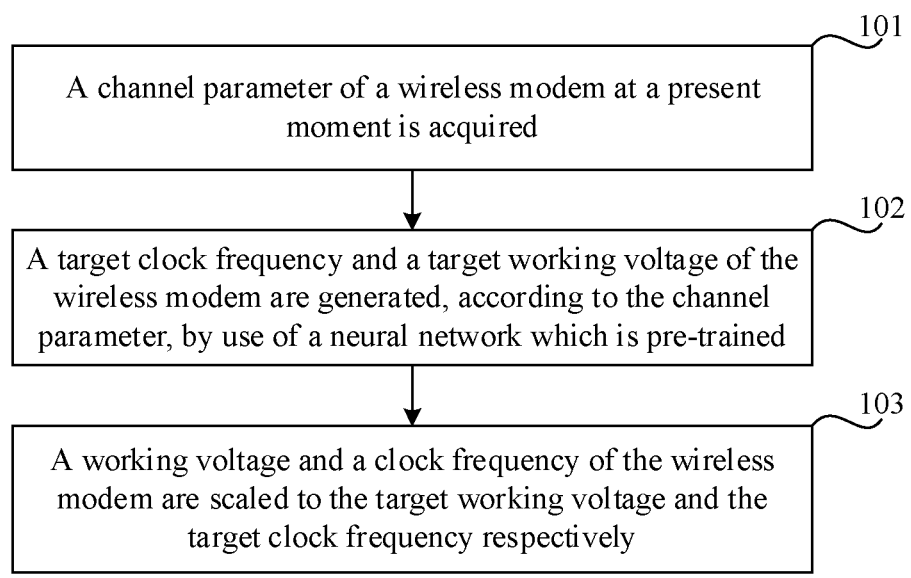
FIG. 1 is a flowchart showing a method for adjusting a wireless modem, according to some embodiments of the present disclosure.

FIG. 1 is a flowchart showing a method for adjusting a wireless modem, according to some embodiments of the present disclosure. As shown in FIG. 1, the method can include the following operations.

In operation 101, a channel parameter of the wireless modem at a present moment is acquired.

For example, in a wireless communication process, the wireless modem performs data transmission in a transmission environment (i.e., a wireless channel) at the present moment. The wireless modem can acquire the channel parameter capable of reflecting channel quality at the present moment in real time. For example, strength of a desired signal, strength of an interference signal (which may include noise and interference), and strength of a reference signal (pilot signal) and the like may be measured according to various signals (for example, a pilot signal and an answer signal) received by the wireless modem, thereby obtaining the channel parameter. Here, the channel parameter can include, but not limited to, for example, at least one of a channel bandwidth, signal strength, an SNR, RSRP, an uplink/downlink resource scheduling strategy, a modulation mode, a coding mode or a transport block size.

In operation 102, a target clock frequency and a target working voltage of the wireless modem are generated, according to the channel parameter, with a neural network which is pre-trained.

In operation 103, a working voltage and a clock frequency of the wireless modem are adjusted to the target working voltage and the target clock frequency respectively.

Exemplarily, after the channel parameter is acquired, the target clock frequency and target working voltage, adapted to the channel at the present moment, of the wireless modem can be determined according to the channel parameter and the neural network which is pre-trained. The target clock frequency and the target working voltage are an optimal clock frequency and an optimal working voltage of the wireless modem on the premise that a preset performance condition (for example, a bit error rate is less than a threshold value of a bit error rate, or a packet loss rate is less than a threshold value of a packet loss rate, or a transmission success rate is greater than a threshold value of a transmission success rate) is met, and the target clock frequency and the target working voltage can also be understood as a minimum clock frequency and a minimum working voltage.

The neural network may be a neural network which is trained according to a preset sample input set, and can determine target clock frequencies and target working voltages corresponding to different channel parameters according to different channel parameters.

The sample input set can be acquired in a manner of simulating various combinations of the channel parameters by simulation software and recording the target clock frequencies and target working voltages, corresponding to the different channel parameters, of the wireless modem on the premise that the preset performance condition is met. The neural network is trained by using various channel parameters as the sample input set (i.e., input of the neural network) and by using the target clock frequencies and the target working voltages corresponding to the different channel parameters as a sample output set (i.e., output of the neural network). Exemplarily, the neural network may be, for example, a Convolutional Neural Network (CNN). It is to be noted that the CNN is only an example of the neural network in the embodiment of the present disclosure and the present disclosure is not limited thereto but may involve other neural networks.

After the target clock frequency and the target working voltage are acquired, the clock frequency of the wireless modem is adjusted to the target clock frequency, and the working voltage of the wireless modem is adjusted to the target working voltage. The target clock frequency and the target working voltage which are determined by the neural network, are the optimal clock frequency and optimal working voltage that the wireless modem may reach on the premise that the preset performance condition is met during data transmission on a channel indicated by the channel parameters at the present moment.

That is, the target clock frequency and the target working voltage which are determined by the neural network are the minimum clock frequency and the minimum working voltage that are determined in real time according to the channel parameter and that the wireless modem may reach, so that the adjusting accuracy of clock frequency and working voltage can be improved, and power consumption of the wireless modem can be reduced. The preset performance condition can include, but not limited to, for example, that the bit error rate is less than a threshold value of the bit error rate, or the packet loss rate is less than a threshold value of the packet loss rate, or the transmission success rate is greater than a threshold value of the transmission success rate, etc.

It is to be noted that the working voltage and clock frequency of the wireless modem in operation 103 can be understood as a total working voltage and a total clock frequency of the wireless modem. For example, the total working voltage may be a power supply voltage of the wireless modem, and the total clock frequency may be equal to a clock frequency of a processor of the wireless modem.

From the above, according to some embodiments of the present disclosure, the channel parameter of the wireless modem at the present moment is acquired at first; then the target clock frequency and the target working voltage of the wireless modem are generated, according to the channel parameter, with the neural network which is pre-trained; and finally the working voltage and clock frequency of the wireless modem are adjusted to the target working voltage and the target clock frequency respectively. The clock frequency and the working voltage of the wireless modem can be adjusted in real time according to a state of the wireless channel, so that the adjusting accuracy is improved, and the power consumption is reduced.

Furthermore, during a practical application, the wireless modem usually includes multiple function portions and, for example, can include function portions such as the processor, a memory, digital baseband processing portion, a filter, an equalizer, modulation portion, demodulation portion, a coder and a decoder. Each function portion can be a group of Application Specific Integrated Circuits (ASICs) and also correspondingly has a corresponding clock frequency and a corresponding working voltage. In an existing DVFS mechanism, only the clock frequencies and working voltages of the processor and memory of the wireless modem can be adjusted and the clock frequencies and working voltages of the other function portions cannot be adjusted, which increases the power consumption of the wireless modem. Therefore, for each function portion of the wireless modem, the clock frequency and the working voltage of each function portion can also be adjusted respectively according to the method for adjusting the wireless modem disclosed in the present disclosure.

For example, in operation 102, the channel parameter can be used as input of the neural network to acquire at least one target clock frequency and at least one target working voltage which are outputted by the neural network and are corresponding to at least one of the multiple function portions.

When the wireless modem includes the multiple function portions, the corresponding sample input set for training the neural network can include various parameters, and the sample output set can include the at least one target clock frequency and at least one target working voltage, corresponding to various channel parameters, of the at least one function portion on the premise that the preset performance condition is met. The at least one function portion can include all function portions of the wireless modem and can also include part of function portions or a certain portion of the wireless modem.

Correspondingly, if the neural network can output the target clock frequency and the target working voltage which are corresponding to the at least one function portion, an implementation mode of operation 103 can be as follows.

A clock frequency of each of the at least one function portion is adjusted to the target clock frequency which is outputted by the neural network and is corresponding to the function portion, and a working voltage of each of the at least one function portion is adjusted to the target working voltage which is outputted by the neural network and is corresponding to the function portion.

When the wireless modem includes the multiple function portions, the neural network can determine respectively each target clock frequency and each target working voltage, corresponding to different channel parameters, of each function portion according to different channel parameters. Therefore, adjusting the clock frequency of each of various function portions to the target clock frequency corresponding to the function portion and adjusting the working voltage of the function portion to the target working voltage corresponding to the function portion can be implemented in real time according to different channel parameters, to further improve the adjusting accuracy of the clock frequency and working voltage and further reduce the power consumption of the wireless modem.

It is to be noted that the neural network in the embodiment can include an input layer, a convolutional layer, a feedback layer, a fully connected layer and an output layer. The channel parameter is input as a characteristic vector sequence into the input layer at first; a convolutional-layer characteristic is extracted from the characteristic vector sequence via the convolutional layer; a present feedback-layer characteristic is extracted from the convolutional layer via the feedback layer in combination with a previous feedback-layer characteristic and a next feedback-layer characteristic; the feedback-layer characteristic is abstractly process via the fully connected layer to generate the target working voltage and the target clock frequency; and finally the target working voltage and the target clock frequency are outputted via the output layer.

Figure 2:
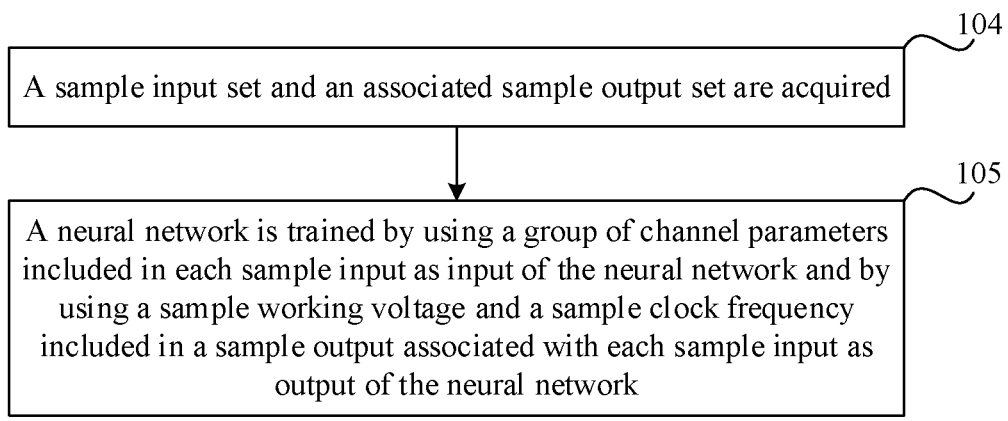
FIG. 2 is a flowchart showing operations for training neural network, according to some embodiments of the present disclosure.

FIG. 2 is a flowchart showing operations for training neural network, according to some embodiments of the present disclosure. As shown in FIG. 2, the neural network is pre-trained through the following operations.

In operation 104, a sample input set and an associated sample output set are acquired, each sample input of the sample input set including a group of channel parameters which are preset for the wireless modem, each sample output of the associated sample output set including a sample working voltage and a sample clock frequency of the wireless modem which operates under a corresponding group of channel parameters, and the sample working voltage and the sample clock frequency being a target working voltage and a target clock frequency of the wireless modem when a preset performance condition is met.

In operation 105, the neural network is trained by using the group of channel parameters included in each sample input as the input of the neural network and by using the sample working voltage and the sample clock frequency included in the sample output associated with each sample input as output of the neural network.

For example, for obtaining the neural network capable of determining the target clock frequencies and target working voltages corresponding to different channel parameters according to different channel parameters, the sample input set (which can be understood as a sample dataset for constructing the neural network) and the associated sample output set can be acquired in advance.

The sample input set includes an input parameter of the neural network, and the sample output set includes an output parameter of the neural network. A purpose of the neural network which is generated by using the sample input set is that the output of the neural network can be matched with the sample output set when the input of the neural network is the sample input set.

Each sample input of the sample input set may be a group of channel parameters which are preset for the wireless modem, namely the sample input set can include multiple groups of channel parameters. Each group of channel parameters can include multiple channel parameters. For example, a group of channel parameters can include the channel bandwidth, the signal strength, the SNR scheduling strategy and the like, namely the channel bandwidth, the signal strength, the SNR scheduling strategy form a vector I.

Each sample output of the associated sample output set can include a combination of the sample working voltage v and the sample clock frequency f of the wireless modem which operates under a corresponding group of channel parameters, and the sample working voltage and the sample clock frequency are the target working voltage and the target clock frequency of the wireless modem when the preset performance condition is met, i.e., an optimal working voltage and an optimal clock frequency of the wireless modem when the preset performance condition is met. The operation that the neural network is generated according to the multiple groups of channel parameters I and the multiple groups of sample working voltages v and the sample clock frequencies f can be understood as that a function F is determined to ensure $F(I)=(f, v)$.

Exemplarily, the wireless modem including, for example, the multiple function portions, a selection rule for the sample output set can include that: at first, under the condition that a group of channel parameters is given, both the clock frequency and the working voltage of each function portion of the wireless modem are set to be maximum values, and in such case, a performance index (which may be, for example, the bit error rate, the packet loss rate and the transmission success rate) of the wireless modem is optimal; and then, for a certain function portion, the clock frequency and the working voltage of the function portion are gradually reduced according to a preset step length until the performance index of the wireless modem (or a performance index of the function portion) does not meet the preset performance condition, and in such case, the clock frequency and the working voltage are the sample clock frequency and the sample working voltage corresponding to the function portion, i.e., the sample clock frequency and the sample working voltage of the function portion under the condition of the group of channel parameters.

The same operations are executed for each function portion of the wireless modem to obtain the corresponding sample clock frequencies and the corresponding sample working voltages, corresponding to the group of channel parameters, of all the function portions.

It is to be noted that training of the neural network (i.e., operation 104 to operation 105) can be executed before adjusting the wireless modem and can also be executed after adjusting the wireless modem or executed in a adjusting process of the wireless modem, namely the neural network can be pre-trained and can also be regulated in a data transmission process of the wireless modem. An execution sequence is not limited in the present disclosure.

Figure 3:
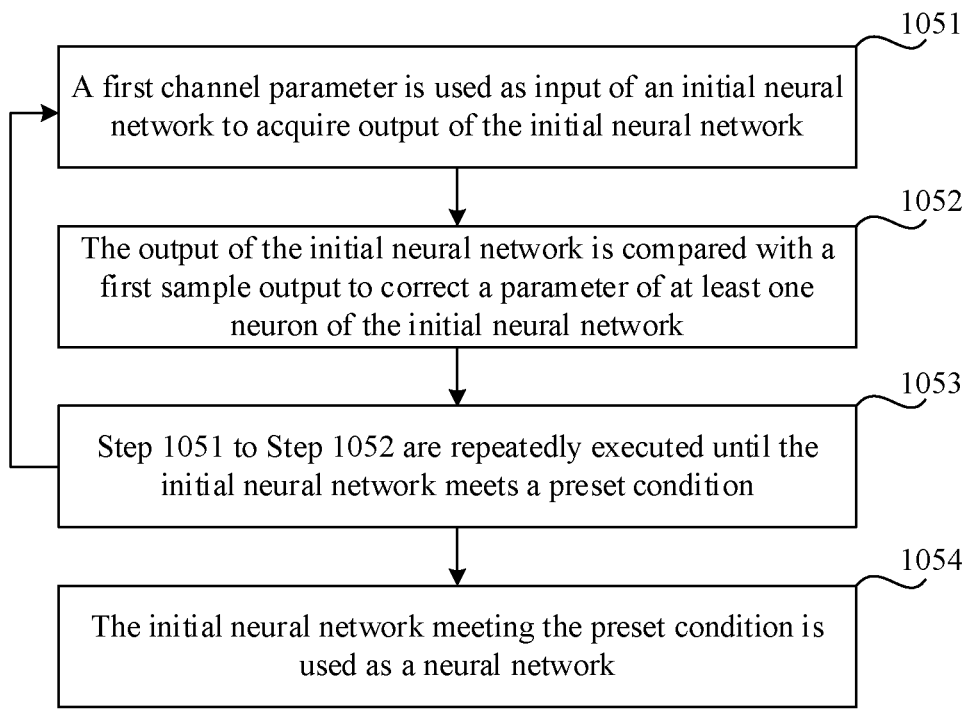
FIG. 3 is another flowchart showing operations for training neural network, according to some embodiments of the present disclosure.

FIG. 3 is another flowchart showing operations for training neural network, according to some embodiments of the present disclosure. As shown in FIG. 3, operation 105 can be implemented through the following operations.

In operation 1051, a first channel parameter is used as input of an initial neural network to acquire output of the initial neural network, the first channel parameter being any group of channel parameters of the multiple groups of channel parameters.

In operation 1052, the output of the initial neural network is compared with a first sample output to correct a parameter of at least one neuron of the initial neural network, the first sample output being a sample working voltage and a sample clock frequency of the wireless modem which operates under the first channel parameter.

For example, for generating the neural network, the initial neural network can be preselected at first (for example, a class, depth and the like of the neural network can be selected according to a requirement); the first channel parameter is used as the input of the initial neural network to acquire the output of the initial neural network; the output of the initial neural network is compared with the first sample output; and the parameter of the at least one neuron of the initial neural network is corrected according to a difference value between the output of the initial neural network and the output of the first sample output.

The first channel parameter is any group of channel parameters of the multiple groups of channel parameters, the first sample output is the sample working voltage and the sample clock frequency of the wireless modem which operates under the first channel parameter, and the parameter of the neuron may be, for example, a weight and bias of the neuron.

In operation 1053, operation 1051 to operation 1052 are repeatedly executed until the initial neural network meets a preset condition.

In operation 1054, the initial neural network meeting the preset condition is used as the neural network.

Exemplarily, operation 1051 to operation 1052 are repeatedly executed to ensure that, when the input of the initial neural network is a certain channel parameter, the output of the initial neural network can be matched with a sample output corresponding to the channel parameter, and when the initial neural network meets the preset condition, the initial neural network is used as the neural network.

The preset condition may be that, when the input of the initial neural network is any of channel parameter of the sample input set, the output of the initial neural network may be consistent with the sample output corresponding to the channel parameter of the sample output set, or a difference value between the output of the initial neural network and the sample output corresponding to the channel parameter of the sample output set may be less than a preset threshold value.

Figure 4:
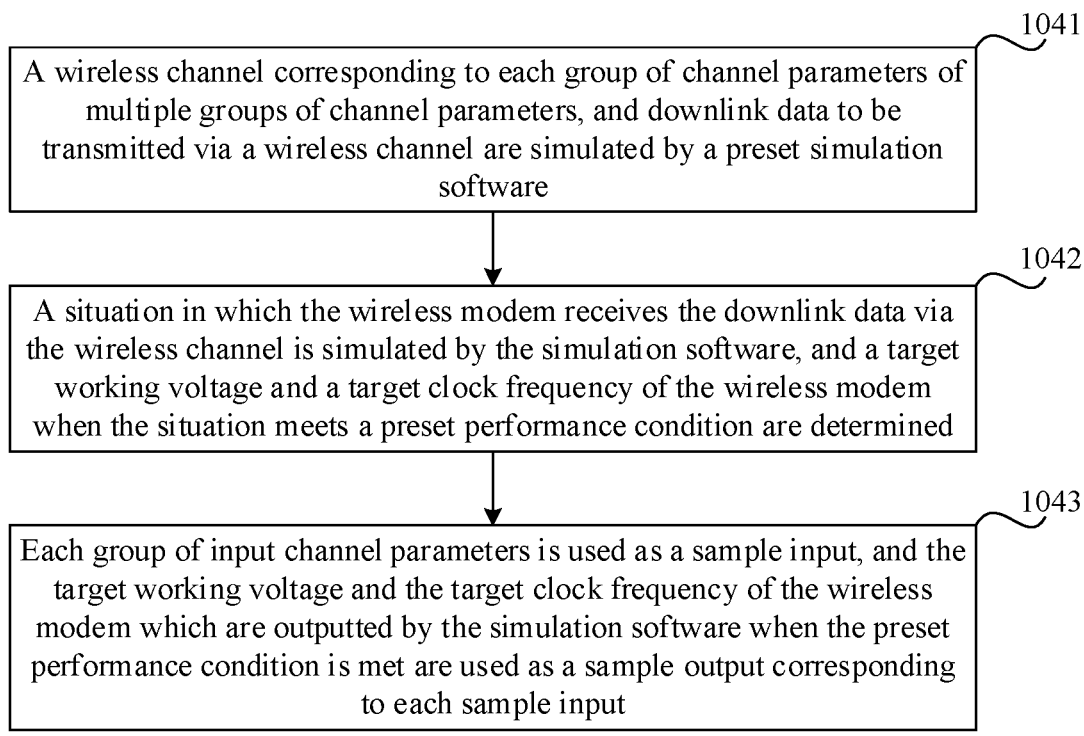
FIG. 4 is another flowchart showing operations for training neural network, according to some embodiments of the present disclosure.

FIG. 4 is another flowchart showing operations for training neural network, according to some embodiments of the present disclosure. As shown in FIG. 4, an implementation mode of operation 104 can include the following operations.

In operation 1041, a wireless channel corresponding to each group of channel parameters of multiple groups of channel parameters, and downlink data to be transmitted via the wireless channel are simulated by a preset simulation software.

In operation 1042, a situation in which the wireless modem receives the downlink data via the wireless channel is simulated by the simulation software, and the target working voltage and the target clock frequency of the wireless modem when the situation meets the preset performance condition are determined.

In operation 1043, each group of input channel parameters is used as a sample input, and the target working voltage and the target clock frequency of the wireless modem which are outputted by the simulation software when the preset performance condition is met are used as a sample output corresponding to each sample input.

For example, the sample input set and the associated sample output set can be acquired in a manner of simulating the multiple groups of channel parameters by the simulation software and then simulating the downlink data to be transmitted under the condition of the multiple groups of channel parameters, to acquire the multiple groups of sample outputs corresponding to the multiple groups of channel parameters (i.e., the sample clock frequencies and sample working voltages corresponding to the multiple groups of channel parameters) on the premise that the wireless modem meets the preset performance condition (for example, the bit error rate is less than a threshold value of the bit error rate).

The wireless modem can also perform data transmission on a practical wireless channel, and the multiple groups of channel parameters for working of the wireless modem and the multiple groups of corresponding sample outputs are acquired by using an external device or instrument according to a preset acquisition frequency within a period of time.

Figure 5:
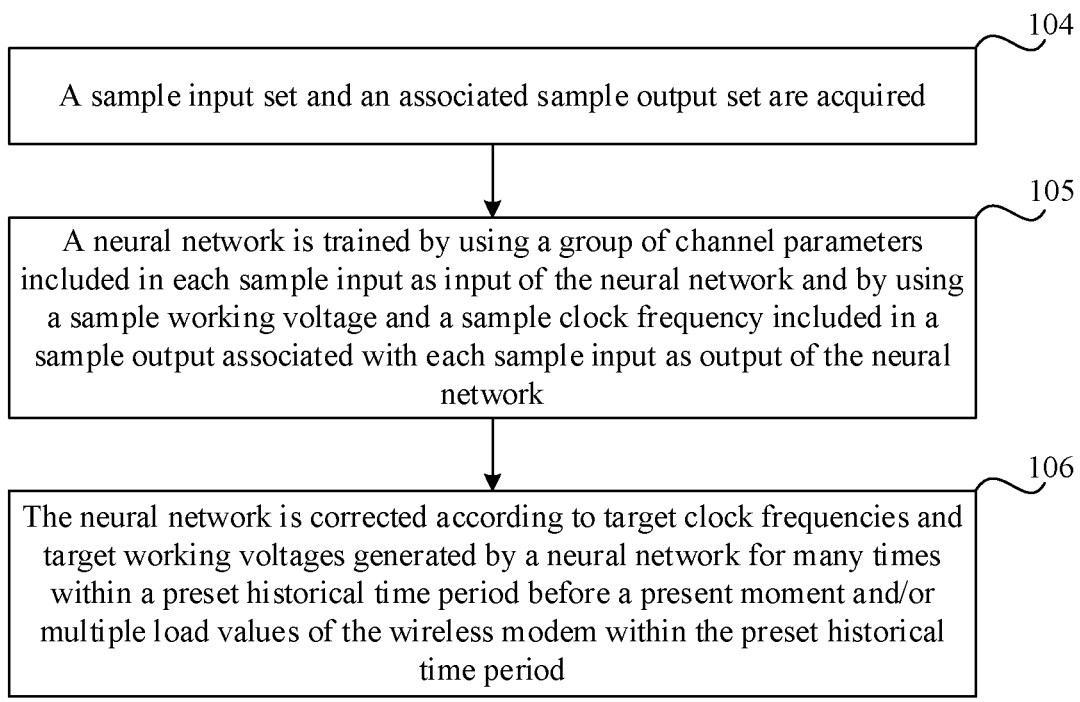
FIG. 5 is another flowchart showing operations for training neural network, according to some embodiments of the present disclosure.

FIG. 5 is another flowchart showing operations for training neural network, according to some embodiments of the present disclosure. As shown in FIG. 5, after operation 105, the neural network is further corrected through the following operation.

In operation 106, the neural network is corrected according to the target clock frequencies and the target working voltages generated by the neural network for many times within a preset historical time period before the present moment and/or multiple load values of the wireless modem within the preset historical time period.

For example, after the neural network is generated in operation 105, the neural network can further be corrected according to statistical data in a working process of the wireless modem. The statistical data can include, for example, the multiple target clock frequencies and the multiple target working voltages generated by the neural network for many times and recorded according to a preset frequency within the historical time period before the present moment, and can further include the multiple load values of the wireless modem, which are recorded according to the preset frequency within the historical time period. The load value may be a total load value of the wireless modem and may also be a load value of each function portion of the wireless modem. For example, when the channel parameter at the present moment is used as the input of the neural network, differences between the output of the neural network, and the multiple target clock frequencies and multiple target working voltages which are generated by the neural network and are recorded according to the preset frequency within the historical time period are calculated as reverse weights to correct the neural network, to improve a matching degree between the neural network and the wireless channel, further to improve adjusting accuracy of the clock frequency and working voltage and further to reduce the power consumption of the wireless modem.

From the above, according to some embodiments of the present disclosure, the channel parameter of the wireless modem at the present moment is acquired at first, then the target clock frequency and the target working voltage of the wireless modem are generated, according to the channel parameter, with the neural network which is pre-trained, and finally the working voltage and clock frequency of the wireless modem are adjusted to the target working voltage and the target clock frequency respectively. The clock frequency and working voltage of the wireless modem can be adjusted in real time according to a state of the wireless channel, so that the adjusting accuracy is improved, and the power consumption is reduced.

Figure 6:
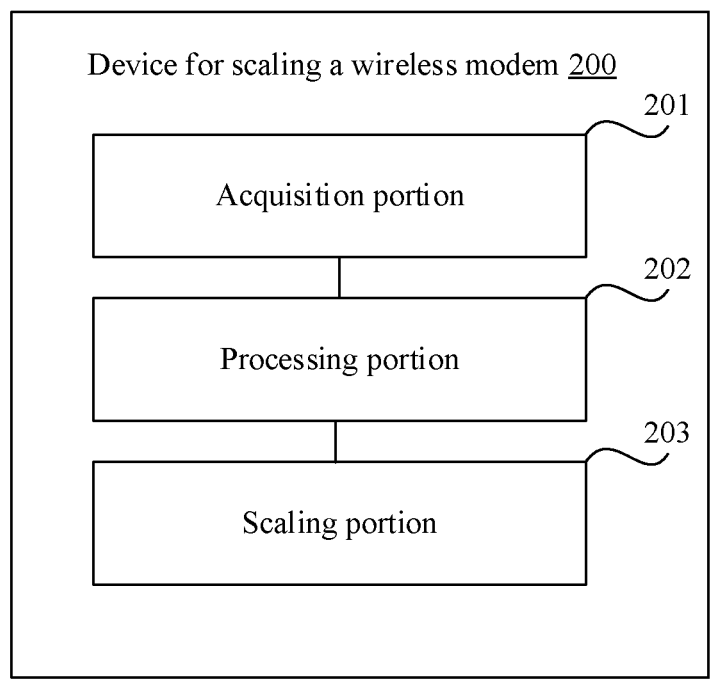
FIG. 6 is a block diagram of a device for adjusting a wireless modem, according to some embodiments of the present disclosure.

FIG. 6 is a block diagram of a device for adjusting a wireless modem, according to some embodiments of the present disclosure. As shown in FIG. 6, the following portions are included.

An acquisition portion 201 is configured to acquire a channel parameter of the wireless modem at a present moment.

A processing portion 202 is configured to generate a target clock frequency and a target working voltage of the wireless modem, according to the channel parameter, with a neural network which is pre-trained.

An adjusting portion 203 is configured to adjust a working voltage and a clock frequency of the wireless modem to the target working voltage and the target clock frequency respectively.

In some embodiments, the channel parameter can include at least one of:

a channel bandwidth, signal strength, an SNR, RSRP, an uplink/downlink resource scheduling strategy, a modulation mode, a coding mode or a transport block size.

Furthermore, when the wireless modem includes multiple function portions, the processing portion 202 can be configured to execute the following operation:

the channel parameter is used as input of the neural network to acquire at least one target clock frequency and at least one target working voltage which are outputted by the neural network and are corresponding to at least one of the multiple function portions.

The adjusting portion 203 can be configured to execute the following operation:

a clock frequency of each of the at least one function portion is adjusted to the target clock frequency which is outputted by the neural network and is corresponding to the function portion, and a working voltage of each of the at least one function portion is adjusted to the target working voltage which is outputted by the neural network and is corresponding to the function portion.

In some embodiments, the neural network is pre-trained through the following operations.

In operation A), a sample input set and an associated sample output set are acquired, each sample input of the sample input set including a group of channel parameters which are preset for the wireless modem, each sample output of the associated sample output set including a sample working voltage and a sample clock frequency of the wireless modem which operates under a corresponding group of channel parameters, and the sample working voltage and the sample clock frequency being a target working voltage and a target clock frequency of the wireless modem when a preset performance condition is met.

In operation B), the neural network is trained by using the group of channel parameters included in each sample input as the input of the neural network and by using the sample working voltage and the sample clock frequency included in the sample output associated with each sample input as output of the neural network.

Operation B) can be implemented through the following operations.

In operation 1), a first channel parameter is used as input of an initial neural network to acquire output of the initial neural network, the first channel parameter being any group of channel parameters of the multiple groups of channel parameters.

In operation 2), the output of the initial neural network is compared with a first sample output to correct a parameter of at least one neuron of the initial neural network, the first sample output being a sample working voltage and a sample clock frequency of the wireless modem which operates under the first channel parameter.

Operations 1) to 2) are repeatedly executed until the initial neural network meets a preset condition. The initial neural network meeting the preset condition is used as the neural network.

In some embodiments, operation A) can be implemented through the following operations.

In operation 3), a wireless channel corresponding to each group of channel parameters of multiple groups of channel parameters, and downlink data to be transmitted via the wireless channel are simulated by a preset simulation software.

In operation 4), a situation in which the wireless modem receives the downlink data via the wireless channel is simulated by the simulation software, and the target working voltage and the target clock frequency of the wireless modem when the situation meets the preset performance condition are determined.

In operation 5), each group of input channel parameters is used as a sample input, and the target working voltage and the target clock frequency of the wireless modem which are outputted by the simulation software when the preset performance condition is met are used as a sample output corresponding to each sample input.

Furthermore, the neural network is further corrected through the following operation.

In operation C), the neural network is corrected according to the target clock frequencies and the target working voltages generated by the neural network for many times within a preset historical time period before the present moment and/or multiple load values of the wireless modem within the preset historical time period.

With respect to the device in the above embodiment, the specific manners for performing operations by individual portions therein have been described in detail in the embodiment regarding the method, which will not be elaborated herein.

From the above, according to some embodiments of the present disclosure, the channel parameter of the wireless modem at the present moment is acquired at first, then the target clock frequency and target working voltage of the wireless modem are generated, according to the channel parameter, with the neural network which is pre-trained, and finally the working voltage and clock frequency of the wireless modem are adjusted to the target working voltage and the target clock frequency respectively. The clock frequency and working voltage of the wireless modem can be adjusted in real time according to a state of the wireless channel, so that adjusting accuracy is improved, and power consumption is reduced.

Figure 7:
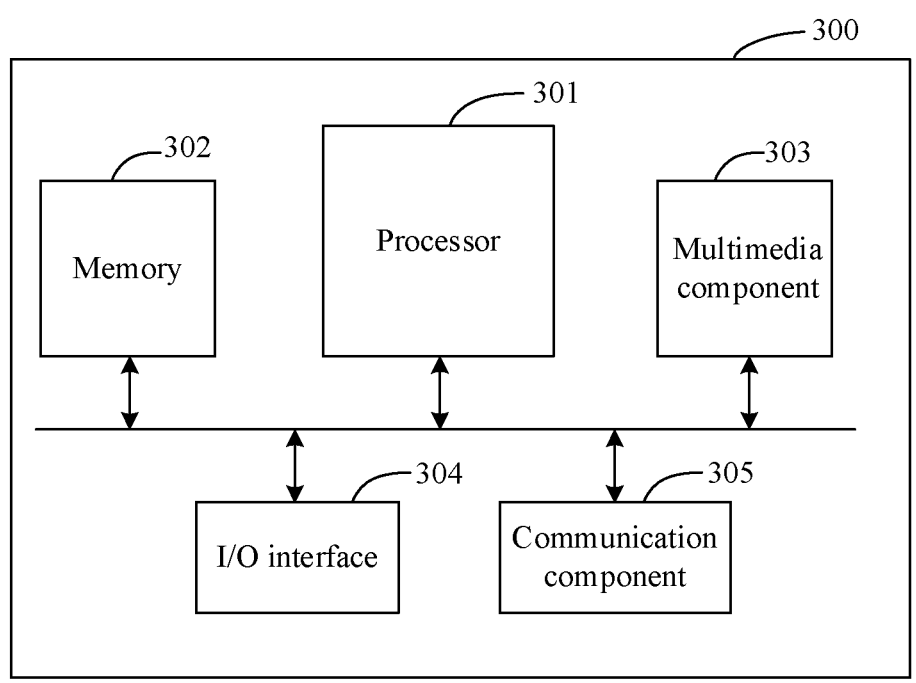
FIG. 7 is a block diagram of an electronic device, according to some embodiments of the present disclosure.

FIG. 7 is a block diagram of an electronic device 300, according to some embodiments of the present disclosure. As shown in FIG. 7, the electronic device 300 can include a processor 301 and a memory 302. The electronic device 300 can further include one or more of a multimedia component 303, an Input/Output (I/O) interface 304 and a communication component 305.

The processor 301 is configured to control overall operations of the electronic device 300 to complete all or part of the operations in the method for adjusting wireless modem. The memory 302 is configured to store various types of data to support the operation of the electronic device 400. Examples of such data include instructions for any application programs or methods operated on the electronic device 400 and data related to the application programs, for example, contact data, transmitted and received messages, pictures, audio, video, etc. The memory 302 can be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The multimedia component 303 can include a screen and an audio component. The screen may be, for example, a touch screen, and the audio component is configured to output and/or input an audio signal. For example, the audio component can include a microphone, and the microphone is configured to receive an external audio signal. The received audio signal can further be stored in the memory 302 or sent through the communication component 305. The audio component further includes at least one speaker configured to output the audio signal. The I/O interface 304 provides an interface between the processor 301 and another interface portion, and the other interface portion can be a keyboard, a mouse, a button and the like. These buttons may be virtual buttons or physical buttons. The communication component 305 is configured for wired or wireless communication between the electronic device 300 and another device. Wireless communication is, for example, Wireless Fidelity (Wi-Fi), Bluetooth, Near Field Communication (NFC), $2^{nd}$-Generation (2G), $3^{rd}$-Generation (3G), $4^{th}$-Generation (4G), or $5^{th}$-Generation (5G) or one or combination of multiple therein, and thus the communication component 305 may correspondingly include a Wi-Fi module, a Bluetooth module, an NFC module and the like.

In some embodiments of the present disclosure, the electronic device 300 may be implemented by one or more Application Specific Integrated Circuit (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method for adjusting wireless modem.

Another exemplary embodiment also provides a computer-readable storage medium including a program instruction, the program instruction being executed by a processor to implement the operations of the method for adjusting wireless modem. For example, the computer-readable storage medium may be the memory 302 including the program instruction, and the program instruction may be executed by the processor 301 of the electronic device 300 to complete the method for adjusting wireless modem.

From the above, according to some embodiments of the present disclosure, the channel parameter of the wireless modem at the present moment is acquired at first, then the target clock frequency and the target working voltage of the wireless modem are generated, according to the channel parameter, with the neural network which is pre-trained, and finally the working voltage and clock frequency of the wireless modem are adjusted to the target working voltage and the target clock frequency respectively. The clock frequency and working voltage of the wireless modem may be adjusted in real time according to a state of the wireless channel, so that adjusting accuracy is improved, and power consumption is reduced.

The exemplary implementation modes according to some embodiments of the present disclosure is described above in combination with the accompanying drawings in detail, but the present disclosure is not limited to specific details in the implementation mode and all other implementation solutions of the present disclosure apparent to those skilled in the art within the scope of the technical concept of the present disclosure after considering the specification and implementing the present disclosure shall fall within the scope of protection of the present disclosure.

In addition, it is to be noted that each specific technical characteristic described herein may be combined in any proper manner without conflicts. Meanwhile, different implementation modes of the present disclosure may also be freely combined without prejudice to the idea of the present disclosure, and such combinations shall also be considered as contents disclosed in the present disclosure.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light-emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present disclosure is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for adjusting a wireless modem, comprising:
    acquiring a channel parameter of the wireless modem at a present moment;
    generating, according to the channel parameter, a target clock frequency and a target working voltage of the wireless modem with a neural network which is pre-trained; and
    adjusting a working voltage and a clock frequency of the wireless modem to the target working voltage and the target clock frequency, respectively,
    wherein the neural network is pre-trained through operations of:
    acquiring a sample input set and an associated sample output set, each sample input of the sample input set comprising a group of channel parameters which are preset for the wireless modem, each sample output of the associated sample output set comprising a sample working voltage and a sample clock frequency of the wireless modem which operates under a corresponding group of channel parameters, and the sample working voltage and the sample clock frequency being a target working voltage and a target clock frequency of the wireless modem when a preset performance condition is met; and
    training the neural network by using the group of channel parameters comprised in each sample input as the input of the neural network and by using the sample working voltage and the sample clock frequency comprised in the sample output associated with each sample input as output of the neural network.

2. The method of claim 1, wherein the acquiring the sample input set and the associated sample output set comprises:
    simulating, by a preset simulation software, a wireless channel corresponding to each group of channel parameters of a plurality of groups of channel parameters and simulating downlink data to be transmitted via the wireless channel;
    simulating, by the simulation software, a situation in which the wireless modem receives the downlink data via the wireless channel, and determining the target working voltage and the target clock frequency of the wireless modem when the situation meets the preset performance condition; and using each group of input channel parameters as a sample input, and using the target working voltage and the target clock frequency of the wireless modem which are outputted by the simulation software when the preset performance condition is met as a sample output corresponding to each sample input.

3. The method of claim 1, wherein, after the training the neural network, the method further comprises: correcting the neural network by:

correcting the neural network according to the target clock frequencies and the target working voltages generated by the neural network for many times within a preset historical time period before the present moment and/or a plurality of load values of the wireless modem within the preset historical time period.

4. The method of claim 1, wherein the channel parameter comprises at least one of:

a channel bandwidth, signal strength, a Signal Noise Ratio (SNR), Reference Signal Receiving Power (RSRP), an uplink/downlink resource scheduling strategy, a modulation mode, a coding mode, or a transport block size.

5. The method of claim 1, wherein the preset performance condition comprises one of: a bit error rate is less than a threshold value of the bit error rate, a packet loss rate is less than a threshold value of the packet loss rate, or a transmission success rate is greater than a threshold value of the transmission success rate.

6. The method of claim 2, wherein the training the neural network comprises operations of:

using a first channel parameter as input of an initial neural network to acquire output of the initial neural network, the first channel parameter being any group of channel parameters of the plurality of groups of channel parameters;

comparing the output of the initial neural network a first sample output to correct a parameter of at least one neuron of the initial neural network, the first sample output being a sample working voltage and a sample clock frequency of the wireless modem which operates under the first channel parameter;

repeating the above two operations until the initial neural network meets a preset condition; and using the initial neural network meeting the preset condition as the neural network.

7. The method of claim 6, wherein the preset condition comprises: when the input of the initial neural network is any of channel parameter of the sample input set, the output of the initial neural network is consistent with the sample output corresponding to the channel parameter of the sample output set, or a difference value between the output of the initial neural network and the sample output corresponding to the channel parameter of the sample output set is less than a preset threshold value.

8. A device for adjusting a wireless modem, comprising:
a processor; and
a memory configured to store an instruction executable for the processor,
wherein the processor is configured to:
acquire a channel parameter of the wireless modem at a present moment;
generate, according to the channel parameter, a target clock frequency and a target working voltage of the wireless modem with a neural network which is pre-trained; and adjust a working voltage and a clock frequency of the wireless modem to the target working voltage and the target clock frequency respectively, wherein the processor is further configured to pre-train the neural network by:

acquiring a sample input set and an associated sample output set, each sample input of the sample input set comprising a group of channel parameters which are preset for the wireless modem, each sample output of the associated sample output set comprising a sample working voltage and a sample clock frequency of the wireless modem which operates under a corresponding group of channel parameters and the sample working voltage and the sample clock frequency being a target working voltage and a target clock frequency of the wireless modem when a preset performance condition is met; and training the neural network by using the group of channel parameters comprised in each sample input as the input of the neural network and by using the sample working voltage and the sample clock frequency comprised in the sample output associated with each sample input as output of the neural network.

9. The device of claim 8, wherein the processor is configured to acquire the sample input set and the associated sample output set by:

simulating, by preset simulation software, a wireless channel corresponding to each group of channel parameters of a plurality of groups of channel parameters and simulating downlink data to be transmitted via the wireless channel;

simulating, by the simulation software, a situation in which the wireless modem receives the downlink data via the wireless channel, and determining the target working voltage and the target clock frequency of the wireless modem when the situation meets the preset performance condition; and using each group of input channel parameters as a sample input, and using the target working voltage and the target clock frequency of the wireless modem which are outputted by the simulation software when the preset performance condition is met as a sample output corresponding to each sample input.

10. The device of claim 8, wherein, after the training the neural network, the processor is further configured to correct the neural network by:

correcting the neural network according to the target clock frequencies and the target working voltages generated by the neural network for many times within a preset historical time period before the present moment and/or a plurality of load values of the wireless modem within the preset historical time period.

11. The device of claim 8, wherein the channel parameter comprises at least one of:

a channel bandwidth, signal strength, a Signal Noise Ratio (SNR), Reference Signal Receiving Power (RSRP), an uplink/downlink resource scheduling strategy, a modulation mode, a coding mode or a transport block size.

12. The device of claim 8, wherein the preset performance condition comprises one of: a bit error rate is less than a threshold value of the bit error rate, a packet loss rate is less than a threshold value of the packet loss rate, or a transmission success rate is greater than a threshold value of the transmission success rate.

13. The device of claim 9, wherein the training the neural network comprises operations of:
  using a first channel parameter as input of an initial neural network to acquire output of the initial neural network, the first channel parameter being any group of channel parameters of the plurality of groups of channel parameters;
  comparing the output of the initial neural network a first sample output to correct a parameter of at least one neuron of the initial neural network, the first sample output being a sample working voltage and a sample clock frequency of the wireless modem which operates under the first channel parameter;
  repeating the above two operations until the initial neural network meets a preset condition; and
  using the initial neural network meeting the preset condition as the neural network.

14. The device of claim 13, wherein the preset condition comprises: when the input of the initial neural network is any of channel parameter of the sample input set, the output of the initial neural network is consistent with the sample output corresponding to the channel parameter of the sample output set, or a difference value between the output of the initial neural network and the sample output corresponding to the channel parameter of the sample output set is less than a preset threshold value.

15. A non-transitory computer-readable storage medium having stored therein a computer program instruction that, when being executed by a processor, implements the operations of a method for adjusting a wireless modem, wherein the method comprises:
  acquiring a channel parameter of the wireless modem at a present moment;
  generating, according to the channel parameter, a target clock frequency and a target working voltage of the wireless modem with a neural network which is pre-trained; and
  adjusting a working voltage and a clock frequency of the wireless modem to the target working voltage and the target clock frequency respectively,
  wherein the neural network is pre-trained through operations of:
  acquiring a sample input set and an associated sample output set, each sample input of the sample input set comprising a group of channel parameters which are preset for the wireless modem, each sample output of the associated sample output set comprising a sample working voltage and a sample clock frequency of the wireless modem which operates under a corresponding group of channel parameters, and the sample working voltage and the sample clock frequency being a target working voltage and a target clock frequency of the wireless modem when a preset performance condition is met; and
  training the neural network by using the group of channel parameters comprised in each sample input as the input of the neural network and by using the sample working voltage and the sample clock frequency comprised in the sample output associated with each sample input as output of the neural network.

16. The non-transitory computer-readable storage medium of claim 15, wherein the acquiring the sample input set and the associated sample output set comprises:
  simulating, by a preset simulation software, a wireless channel corresponding to each group of channel parameters of a plurality of groups of channel parameters and simulating downlink data to be transmitted via the wireless channel;
  simulating, by the simulation software, a situation in which the wireless modem receives the downlink data via the wireless channel, and determining the target working voltage and the target clock frequency of the wireless modem when the situation meets the preset performance condition; and
  using each group of input channel parameters as a sample input, and using the target working voltage and the target clock frequency of the wireless modem which are outputted by the simulation software when the preset performance condition is met as a sample output corresponding to each sample input.

17. The non-transitory computer-readable storage medium of claim 15, wherein, after the training the neural network, the method further comprises: correcting the neural network by:
  correcting the neural network according to the target clock frequencies and the target working voltages generated by the neural network for many times within a preset historical time period before the present moment and/or a plurality of load values of the wireless modem within the preset historical time period.

18. The non-transitory computer-readable storage medium of claim 15, wherein the channel parameter comprises at least one of:
  a channel bandwidth, signal strength, a Signal Noise Ratio (SNR), Reference Signal Receiving Power (RSRP), an uplink/downlink resource scheduling strategy, a modulation mode, a coding mode, or a transport block size.

19. The non-transitory computer-readable storage medium of claim 15, wherein the preset performance condition comprises one of: a bit error rate is less than a threshold value of the bit error rate, a packet loss rate is less than a threshold value of the packet loss rate, or a transmission success rate is greater than a threshold value of the transmission success rate.

20. The non-transitory computer-readable storage medium of claim 16, wherein the training the neural network comprises operations of:
  using a first channel parameter as input of an initial neural network to acquire output of the initial neural network, the first channel parameter being any group of channel parameters of the plurality of groups of channel parameters;
  comparing the output of the initial neural network a first sample output to correct a parameter of at least one neuron of the initial neural network, the first sample output being a sample working voltage and a sample clock frequency of the wireless modem which operates under the first channel parameter;
  repeating the above two operations until the initial neural network meets a preset condition; and
  using the initial neural network meeting the preset condition as the neural network.

* * * * *